United States Patent
Lee

(10) Patent No.: US 8,166,224 B2
(45) Date of Patent: Apr. 24, 2012

(54) APPARATUS AND METHOD FOR DOCKING OF MOBILE DEVICE SUPPORTING DOCKING STATION

(75) Inventor: Seung-Chul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/487,584

(22) Filed: Jun. 18, 2009

(65) Prior Publication Data

US 2010/0036991 A1 Feb. 11, 2010

(30) Foreign Application Priority Data

Aug. 5, 2008 (KR) .................. 10-2008-0076327

(51) Int. Cl.
*G06F 13/00* (2006.01)
(52) U.S. Cl. ......... 710/304; 710/301; 710/302; 710/303
(58) Field of Classification Search ........... 710/301–306
See application file for complete search history.

(56) References Cited

U.S. PATENT DOCUMENTS

| 5,798,951 | A | * | 8/1998 | Cho et al. ................... 710/303 |
| 5,862,349 | A | * | 1/1999 | Cho et al. ................... 710/304 |
| 5,933,609 | A | * | 8/1999 | Walker et al. ............... 710/304 |
| 7,532,461 | B2 | * | 5/2009 | Krancher et al. ......... 361/679.41 |
| 2004/0034730 | A1 | * | 2/2004 | Yu ............................. 710/304 |

FOREIGN PATENT DOCUMENTS

| JP | 8-179856 A | 7/1996 |
| JP | 2003-157124 A | 5/2003 |
| JP | 2006-301770 A | 11/2006 |
| KR | 10-2000-0069050 A | 11/2000 |

* cited by examiner

*Primary Examiner* — Brian Misiura
*Assistant Examiner* — Kim Huynh
(74) *Attorney, Agent, or Firm* — Jefferson IP Law, LLP

(57) ABSTRACT

An apparatus and method for docking of a mobile device supporting a docking station are provided. The apparatus includes a connection detector, an undock execution unit, and a hotdock execution unit. The connection detector performs a function for transitioning to a hotdock mode. The undock execution unit performs a function for transitioning from the hotdock mode to an undock mode. The hotdock execution unit performs a function for transitioning from the undock mode to the hotdock mode.

15 Claims, 4 Drawing Sheets

APPARATUS AND METHOD FOR DOCKING OF MOBILE DEVICE SUPPORTING DOCKING STATION

PRIORITY

The present application claims the benefit under 35 U.S.C. §119(a) of a Korean patent application filed in the Korean Intellectual Property Office on Aug. 5, 2008 and assigned Serial No. 10-2008-0076327, the entire disclosure of which is hereby incorporated by reference.

BACKGROUND OF THE INVENTION

1. Field of the Invention

The present invention relates to a mobile device supporting a docking station. More particularly, the present invention relates to an apparatus and method for docking of a mobile device supporting a docking station.

2. Description of the Related Art

In general, unlike a desktop computer, a laptop computer does not have significant interface capabilities for use with peripherals, such as a local printer, a backup drive, a large capacity storage device, etc. Thus, for the sake of convenience of a user of a mobile device having a limited interface, such as the laptop computer, a docking station for providing additional input/output interface capabilities is used. That is, in the laptop computer, the docking station provides additional interface capabilities for access with an external device, thereby effectively providing a user experience similar to the desktop computer. Thus, if the docking station is used, a user may use an extended slot, an external memory device, a local printer, etc. with the laptop computer as they would with the desktop computer.

To use interface capabilities provided through a docking station, a mobile device has to physically combine with the docking station. A process in which, in a power on state, the mobile device combines with the docking station, thereby recognizing the docking station and enabling the use of the interface is referred to as a 'hotdock'. A process in which the docking station is separated by software or hardware from the mobile device in the hotdock mode is referred to as an 'undock'. FIG. 1 is a diagram illustrating a state transition of a mobile device supporting a docking station according to the conventional art. Referring to FIG. 1, the mobile device has a separation state 110, and states of a hotdock mode 120 and an undock mode 130. The separation state 110 may transition to the hotdock mode 120 and is achieved through physical connection 115 between the mobile device and the docking station. The hotdock mode 120 may transition to the undock mode 130 and is achieved through a user's undock command 125. In addition, the undock mode 130 may transition to the separation state 110, and is achieved through physical disconnection 135 of the mobile device from the docking station by a user.

Here, if there is a transition by software to the undock mode 130 through the undock command 125, that is, if the hotdock mode 120 is released without physical disconnection, although the mobile device and the docking station are in physical connection, the mobile device does not use the interface capabilities of the docking station. At this time, for re-entry into the hotdock mode 120, a user has to transition the mobile device to the separation state 110 and then perform a physical reconnection, or reboot the mobile device.

As described above, a user may extend input/output interface capabilities of a mobile device by using a docking station. However, in order to re-enter a hotdock mode after entering an undock mode by software, physical disconnection and reconnection, or rebooting of the mobile device, is required. Thus, there is a problem that, upon hotdock mode entry, the user may be inconvenienced.

SUMMARY OF THE INVENTION

An aspect of the present invention is to address at least the above-mentioned problems and/or disadvantages and to provide at least the advantages described below. Accordingly, an aspect of the present invention is to provide an apparatus and method for solving a user's inconvenience generated at the time of transition from an undock mode to a hotdock mode in a mobile device supporting a docking station.

Another aspect of the present invention is to provide an apparatus and method for transitioning from an undock mode to a hotdock mode without physical disconnection and reconnection in a mobile device supporting a docking station.

A further aspect of the present invention is to provide an apparatus and method for transitioning from an undock mode to a hotdock mode without rebooting of a mobile device that supports a docking station.

The above aspects are addressed by providing an apparatus and method for docking a mobile device supporting a docking station.

In accordance with an aspect of the present invention, a mobile device apparatus supporting a docking station is provided. The apparatus includes a connection detector, an undock execution unit, and a hotdock execution unit. If a physical connection with the docking station is detected, the connection detector performs a function for transitioning to a hotdock mode. If a transition command to an undock mode is detected in a physical connection state with the docking station, the undock execution unit performs a function for transitioning from the hotdock mode to the undock mode. After transitioning to the undock mode, if a transition command to the hotdock mode is detected before a physical disconnection with the docking station, the hotdock execution unit performs a function for transitioning from the undock mode to the hotdock mode.

In accordance with another aspect of the present invention, an operation method of a mobile device supporting a docking station is provided. The method includes transitioning to a hotdock mode if a physical connection with the docking station is detected, transitioning from the hotdock mode to the undock mode if a transition command to an undock mode is detected in a physical connection state with the docking station, and after transitioning to the undock mode, if a transition command to the hotdock mode is detected before a physical disconnection with the docking station, transitioning from the undock mode to the hotdock mode.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technology for transitioning from an undock mode to a hotdock mode without physical disconnection and reconnection, or rebooting of a mobile device, according to exemplary embodiments of the present invention, is described below. Here, the mobile device may be a mobile computing device, etc. such as a laptop computer, a mobile phone, an electronic scheduler, a mobile digital media player, and the like. Thus, the present invention is equally applicable to all mobile devices that are combinable with a docking station.

Figure 1:
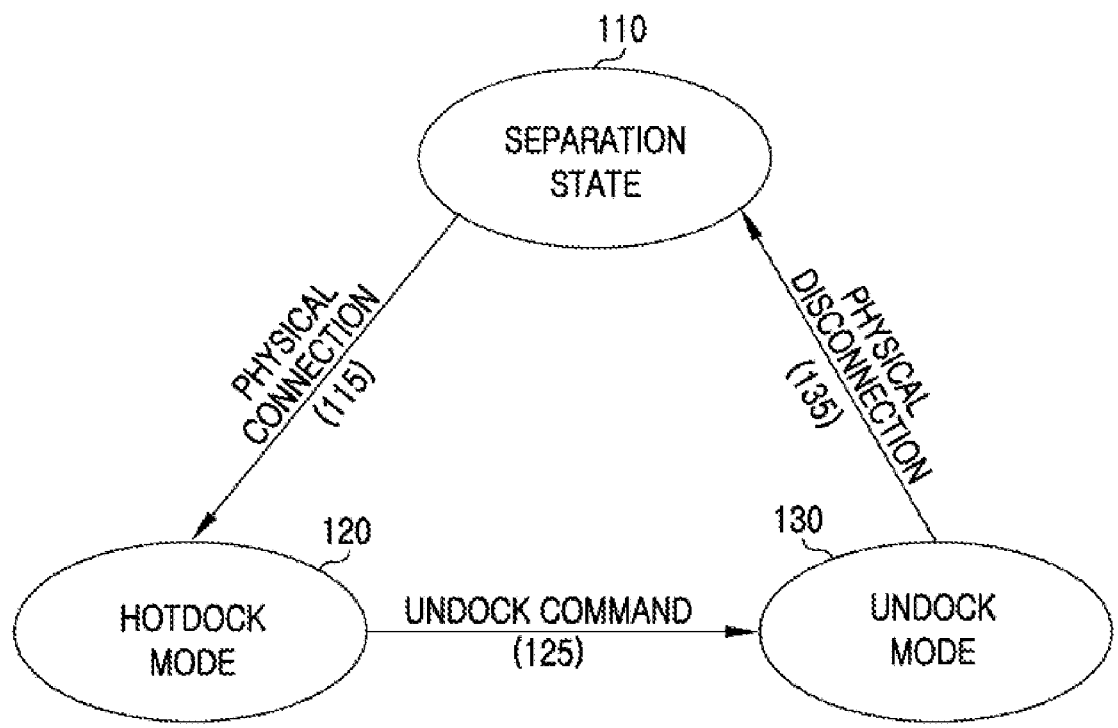
FIG. 1 is a diagram illustrating a state transition of a mobile device supporting a docking station according to the conventional art.
Figure 2:
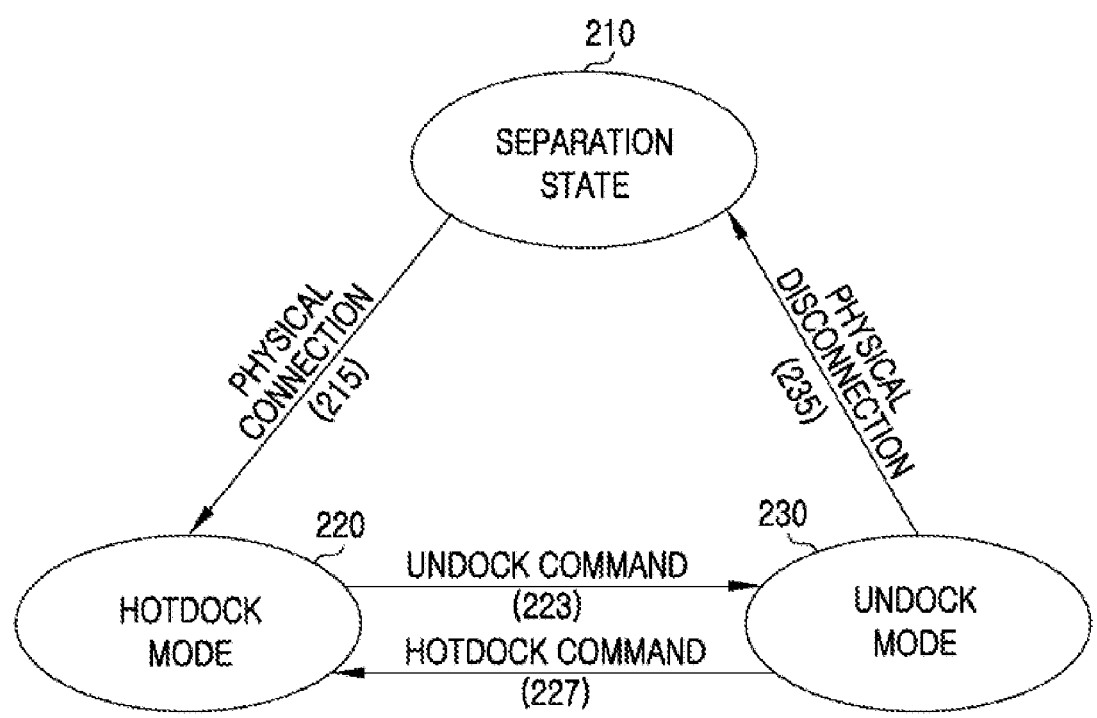
FIG. 2 is a diagram illustrating a state transition of a mobile device supporting a docking station according to an exemplary embodiment of the present invention.

FIG. 2 is a diagram illustrating a state transition of a mobile device supporting a docking station according to an exemplary embodiment of the present invention.

Referring to FIG. 2, the mobile device has three states including a separation state 210, a hotdock mode 220 and an undock mode 230. A transition from the separation state 210 to the hotdock mode 220 is possible through a physical connection 215. A transition from the hotdock mode 220 to the undock mode 230 is possible through a user's undock command 223. On the contrary, a transition from the undock mode 230 to the hotdock mode 220 is possible through a user's hotdock command 227. In addition, a transition from the undock mode 230 to the separation state 210 is possible through physical disconnection 235 of the mobile device from the docking station by a user.

For the sake of a transition from an undock mode to a hotdock mode by a hotdock command among the state transitions illustrated in FIG. 2, a mobile device according to an exemplary embodiment of the present invention may have a structure able to recognize docking or undocking irrespective of a physical connection state. For example, the mobile device may have a structure for determining connection or disconnection with a docking station through an internal device having a switching form and a secondary form. Alternately, the mobile device may have a structure for determining connection or disconnection with a docking station through a signal exchange with the docking station by using at least one system chipset of a Peripheral Component Interconnect (PCI) bus, a specified controller or Memory Controller Hub (MCH), an Input-output Controller Hub (ICH), and the like.

Figure 3:
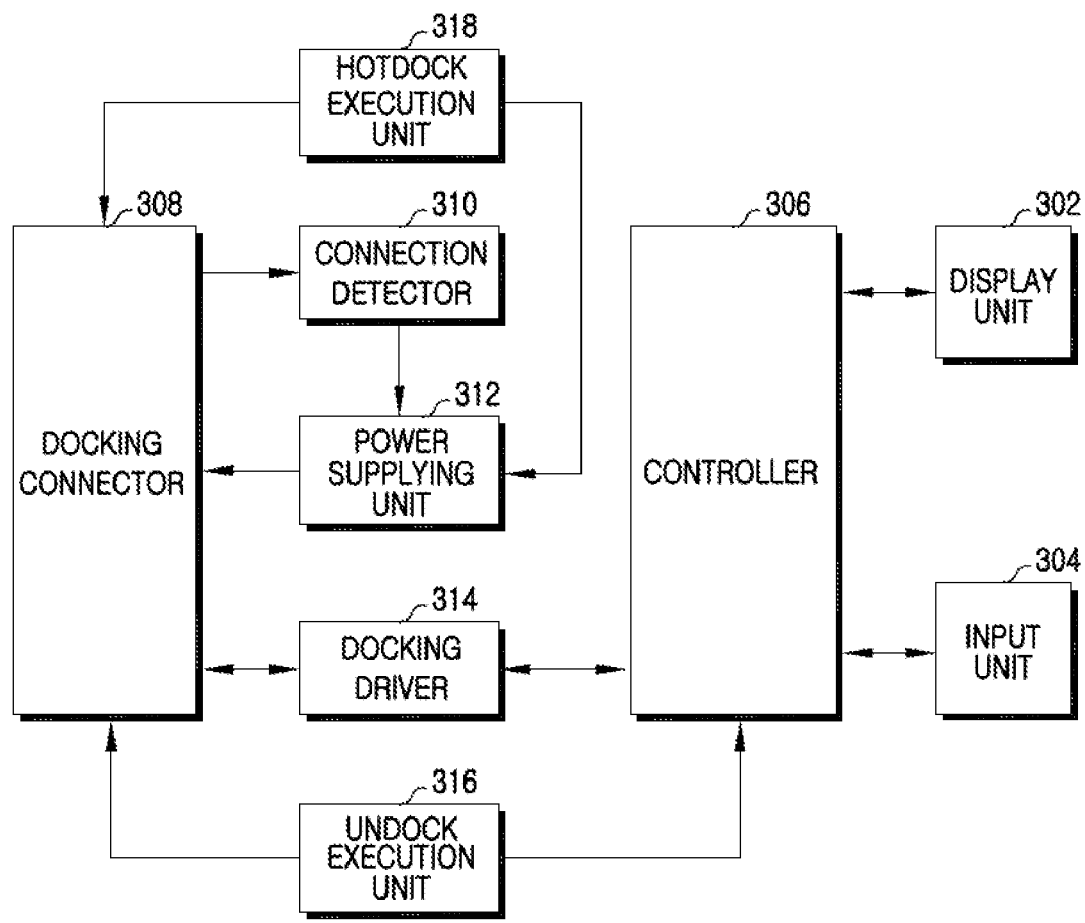
FIG. 3 is a block diagram illustrating a construction of a mobile device supporting a docking station according to an exemplary embodiment of the present invention.

FIG. 3 is a block diagram illustrating a construction of a mobile device supporting a docking station according to an exemplary embodiment of the present invention.

Referring to FIG. 3, the mobile device includes a display unit 302, an input unit 304, a controller 306, a docking connector 308, a connection detector 310, a power supplying unit 312, a docking driver 314, an undock execution unit 316, and a hotdock execution unit 318.

The display unit 302 displays status information generated during operation of the mobile device, and numerals, characters, video, etc. according to execution of an application program. For example, the display unit 302 may be comprised of a Liquid Crystal Display (LCD), an Organic Light-Emitting Diode (OLED), etc. The input unit 304 recognizes an input generated by a user, and provides information corresponding to the input to the controller 306. That is, the input unit 312 processes a user's input through a keyboard, a keypad, a touch screen, a touch pad, a mouse, a specific function button, etc. For example, a specific function button for a transition command to a hotdock mode or a specific function button for a transition command to an undock mode may be associated with the mobile device.

The controller 306 controls general functions of the mobile device. That is, the controller 306 determines a function to be executed depending on a user's input, and controls execution of the corresponding function. More particularly, according to an exemplary embodiment of the present invention, if a transition command to a hotdock mode by a user's input is detected, the controller 306 notifies the hotdock execution unit 318 of the detected transition command to the hotdock mode. In addition, if a transition command to an undock mode depending on a user's input is detected, the controller 306 notifies the undock execution unit 316 of the detected transition command to the undock mode. Here, the transition command to the hotdock mode and the transition command to the undock mode are input through a specific function button associated with the mobile device, a combination of key input, or software manipulation.

The docking connector 308 is a physical interface for physically connecting the mobile device with the docking station. The docking connector 308 may provide one or more of a data transfer path, power transfer path, and control signal transfer path between the mobile device and the docking station.

The connection detector 310 determines if the mobile device connects to or disconnects from the docking station. If the connection of the docking station is detected, the connection detector 310 performs a function for transitioning to a hotdock mode. That is, the connection detector 310 triggers operations of the power supplying unit 312 and the docking driver 314. Here, a method of determining if the mobile device is connected or disconnected from the docking station is different depending on an exemplary embodiment implemented. For example, the connection detector 310 detects connection or disconnection by using a reference signal having a specific voltage value that is grounded (GND) while connecting with the docking station, or by detecting a signal while connecting with the docking station. A case of using the reference signal is hereafter described in more detail. The reference signal has a specific voltage value, and a circuit for generating the reference signal is physically combined with the docking station due to the connection with the docking station. At this time, the docking station has a ground circuit, and a contact point of the circuit for generating the reference signal is connected with the ground circuit. Thus, because the reference signal is grounded while connecting with the docking station, the connection detector 310 detects connection or disconnection through a variation of the reference signal.

The power supplying unit 312 supplies power to the docking station according to an instruction of the connection detector 310 and the hotdock execution unit 318. That is, the power supplying unit 312 supplies power necessary for activation of a chipset within the docking station and ports. The docking driver 314 performs a function for enabling the use of the ports of the docking station according to an instruction of the connection detector 310 and the hotdock execution unit 318. That is, the docking driver 314 recognizes the chipset managing the ports of the docking station located within the docking station, and processes a data exchange between the docking station and the controller 306.

The undock execution unit 316 performs a function for transitioning from a hotdock mode to an undock mode according to an instruction of the controller 306. That is, the undock execution unit 316 instructs the power supplying unit 312 to stop supplying power, and instructs the docking driver 314 to release a logical connection with the docking station. The hotdock execution unit 318 performs a function for transitioning from the undock mode of a connection state to the hotdock mode according to an instruction of the controller 306. At this time, a detailed structure of the hotdock execution unit 318 may be different depending on a connection detection method used with the docking station. For example, if a reference signal is used that has a specific voltage value that is grounded while connecting with the docking station for the detection of the connection, the hotdock execution unit 318 refreshes the reference signal. In a detailed example, the hotdock execution unit 318 includes a circuit for generating the reference signal and a switch for switching on/off a connection of the circuit and a ground circuit of the docking station. Thus, before a transition command to a hotdock mode, the switch provided in the hotdock execution unit 318 is in an ON state. If the transition command to the hotdock mode is detected, the switch provided in the hotdock execution unit 318 is temporarily switched off. Thus, the reference signal is temporarily released from a ground state, and again becomes the ground state.

Figure 4:
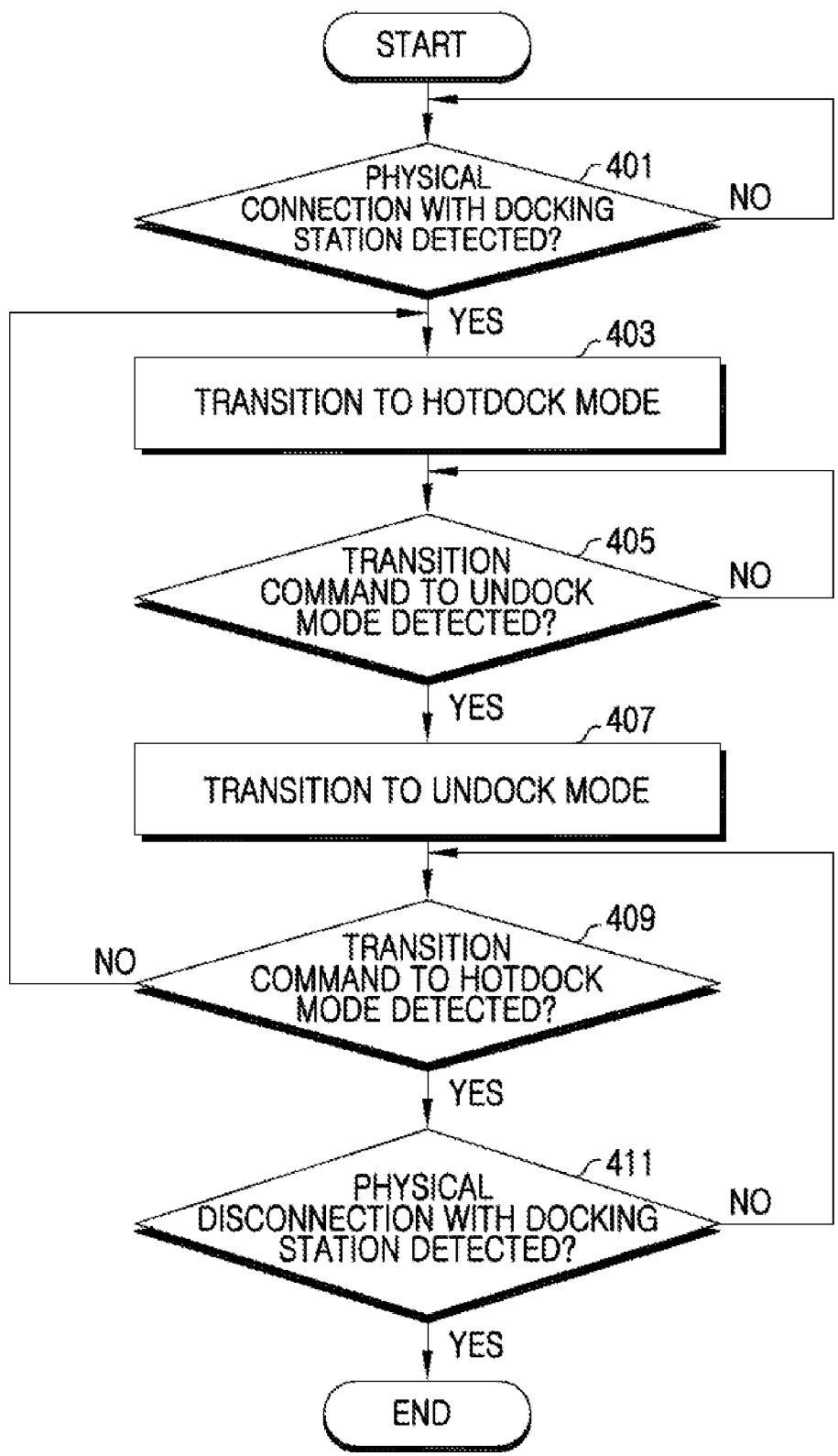
FIG. 4 is a flowchart illustrating an operation procedure of a mobile device supporting a docking station according to an exemplary embodiment of the present invention.

FIG. 4 is a flowchart illustrating an operation procedure of a mobile device supporting a docking station according to an exemplary embodiment of the present invention.

Referring to FIG. 4, in step 401, the mobile device determines if a physical connection with the docking station is detected. Here, a method of recognizing the physical connection with the docking station may be different depending on an exemplary embodiment implemented. For example, the physical connection with the docking station is detected through a reference signal having a specific voltage value being grounded, or detection of a signal representing a connection with the docking station, etc.

If the physical connection with the docking station is detected, the mobile device proceeds to step 403 and transitions to a hotdock mode. That is, the mobile device recognizes a chipset for supplying power to the docking station and manages ports of the docking station.

The mobile device then proceeds to step 405 and determines if a transition command to an undock mode is detected. The transition command to an undock mode may be input by a user. Here, the transition command to the undock mode may be input through a specific function button provided in the mobile device, a combination of key input, or software manipulation.

If the transition command to the undock mode is detected, the mobile device proceeds to step 407 and transitions to the undock mode. That is, the mobile device stops supplying power to the docking station, and releases a logical connection with the docking station.

After transitioning to the undock mode, the mobile device proceeds to step 409 and determines if a transition command to the hotdock mode is input. Here, the transition command to the hotdock mode is input through a specific function button provided in the mobile device, a combination of key input, or software manipulation.

If the transition command to the hotdock mode is not detected, the mobile device proceeds to step 411 and determines if a physical disconnection with the docking station is detected. For example, the physical disconnection with the docking station is detected through a release of a reference signal having a specific voltage value from ground, or detection of a signal representing disconnection with the docking station, etc. If the physical disconnection with the docking station is not detected, the mobile device returns to step 409.

That is, the mobile device determines if the transition command to the hotdock mode is detected or the physical disconnection with the docking station is detected through steps 409 and 411. If the transition command to the hotdock mode is detected without the physical disconnection with the docking station, the mobile device proceeds to step 403 and transitions to the hotdock mode. Here, a detailed operation for transition to the hotdock mode may be different depending on a method of detecting connection with the docking station. For example, if a reference signal is used having a specific voltage value that is grounded while connecting with the docking station to detect the connection, the mobile device refreshes the reference signal. In more detail, the mobile device temporarily turns off a switch for switching on/off a connection of the circuit which generates the reference signal and the ground circuit of the docking station. On the contrary, if the physical disconnection with the docking station is detected, the mobile device terminates the procedure.

Exemplary embodiments of the present invention may prevent a waste of a user's time and endeavor by transitioning to a hotdock mode without reconnection or rebooting a mobile device supporting a docking station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus of a mobile device supporting a docking station, the apparatus comprising:

a connection detector for performing a function for transitioning to a hotdock mode when a physical connection that enables docking with the docking station is detected;

an undock execution unit for performing a function for transitioning from the hotdock mode to the undock mode when a transition command to an undock mode is detected in a state comprising the physical connection that enables docking with the docking station; and a hotdock execution unit for, while physically connected after transitioning from the hotdock mode to the undock mode, refreshing a signal for detecting the physical connection that enables docking with the docking station when a transition command to the hotdock mode is detected before a physical disconnection with the docking station, to transition from the undock mode in the state comprising the physical connection that enables docking to the hotdock mode.

2. The apparatus of claim 1, wherein the transition command to the hotdock mode and the transition command to the undock mode are input through one of a specific function button associated with the mobile device, a combination of key input, and software manipulation.

3. The apparatus of claim 1, wherein the signal for detecting the physical connection that enables docking comprises a reference signal that is grounded while connecting with the docking station and a signal generated while connecting with the docking station.

4. The apparatus of claim 3, wherein the hotdock execution unit comprises:
   a circuit for generating the reference signal; and
   a switch for switching on/off a connection of the circuit and a ground circuit of the docking station,
   wherein the reference signal is refreshed by temporarily turning off the switch when the transition command to the hotdock mode is detected.

5. The apparatus of claim 1, further comprising:
   a power supplying unit for supplying power to the docking station; and
   a docking driver for enabling use of a chipset managing ports of the docking station.

6. The apparatus of claim 5, wherein the power supplying unit supplies power to the docking station according to an instruction of the connection detector and the hotdock execution unit.

7. The apparatus of claim 5, wherein the docking driver recognizes the chipset managing the ports of the docking station and processes a data exchange between the docking station and the mobile device.

8. The apparatus of claim 1, wherein the connection detector comprises at least one of a Peripheral Component Interconnect (PCI) bus, a specified controller or Memory Controller Hub (MCH), and an Input-output Controller Hub (ICH).

9. An operation method of a mobile device supporting a docking station, the method comprising:
   transitioning to a hotdock mode when a physical connection that enables docking with the docking station is detected;
   transitioning from the hotdock mode to the undock mode when a transition command to an undock mode is detected in a state comprising the physical connection that enables docking with the docking station; and
   while physically connected after transitioning from the hotdock mode to the undock mode, refreshing a signal for detecting the physical connection that enables docking with the docking station when a transition command to the hotdock mode is detected before a physical disconnection with the docking station, to transition from the undock mode in the state comprising the physical connection that enables docking to the hotdock mode.

10. The method of claim 9, wherein the transition command to the hotdock mode and the transition command to the undock mode are input through one of a specific function button associated with the mobile device, a combination of key input, and software manipulation.

11. The method of claim 9, wherein the signal for detecting the physical connection that enables docking comprises a reference signal that is grounded while connecting with the docking station and a signal generated while connecting the docking station.

12. The method of claim 11, wherein the refreshing of the reference signal comprises temporarily turning off a switch for switching on/off a connection of a circuit which generates the reference signal and a ground circuit of the docking station.

13. The method of claim 9, wherein the transitioning to the hotdock mode comprises:
   supplying power to the docking station; and
   enabling use of a chipset managing ports of the docking station.

14. The method of claim 13, wherein the enabling use of a chipset managing ports of the docking station comprises recognizing the chipset managing the ports of the docking station and processing a data exchange between the docking station and the mobile device.

15. The method of claim 9, wherein a physical connection that enables docking with the docking station is detected using at least one of a Peripheral Component Interconnect (PCI) bus, a specified controller or Memory Controller Hub (MCH), and an Input-output Controller Hub (ICH).

* * * * *